E. C. M. W. STJERNSTEDT.
MEANS FOR ATTACHING SHAFTS TO SPADES OR OTHER TOOLS.
APPLICATION FILED APR. 20, 1909.

941,286.

Patented Nov. 23, 1909.

WITNESSES

INVENTOR
Erik Carl Maria Wilhelm Stjernstedt
BY
ATTY.

UNITED STATES PATENT OFFICE.

ERIK CARL MARIA WILHELM STJERNSTEDT, OF STOCKHOLM, SWEDEN.

MEANS FOR ATTACHING SHAFTS TO SPADES OR OTHER TOOLS.

941,286.  Specification of Letters Patent.  Patented Nov. 23, 1909.

Application filed April 20, 1909. Serial No. 491,172.

*To all whom it may concern:*

Be it known that I, ERIK CARL MARIA WILHELM STJERNSTEDT, a subject of the King of Sweden, and resident of Sveavägen 88, Stockholm, in the Kingdom of Sweden, have invented certain new and useful Improvements in Means for Attaching Shafts to Spades or other Tools, of which the following is a specification, reference being had therein to the accompanying drawing.

The present invention has for its object improved means for attaching the shaft to spades or other tools which are provided with detachable shafts, especially soldiers' spades. It is of a great importance that the shafts of such spades be attached to the spade in a convenient and rapid manner, when the spade is to be used for digging purposes. Furthermore, the said attaching device must be so constructed that a firm attachment of the shaft to the spade may be secured, and the same must, on the other hand, be arranged in such manner that its vital or acting parts are well protected, so that they will not rust, even if the spade is exposed to water, and that they are not thrown into disorder if the said device should be acted upon by pressure or the like.

A suitable form of embodiment of my improved device is illustrated on the accompanying drawing.

Figure 1:
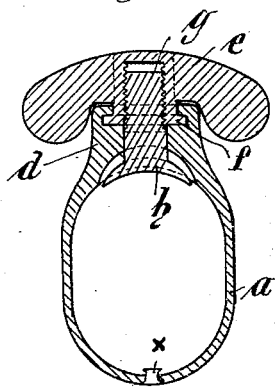
Figure 2:
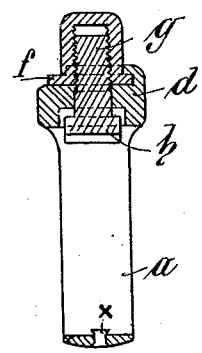
Figure 3:
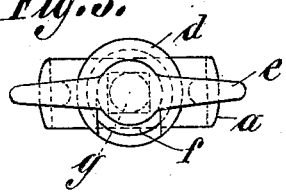
Figure 4:
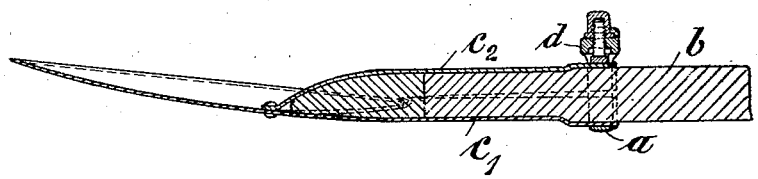

Figures 1 and 2 respectively show two vertical sections through the device at right angle to each other, Fig. 3 is a plan view of the device, and Fig. 4 shows the device attached to a spade.

In Fig. 4 $b$ is the shaft and $c^1$, $c^2$ indicate the two parts of the spade sleeve in which the lower end of the shaft $b$ is to be introduced. The said parts of the sleeve are so arranged that they can yieldingly be approached to one another, and be pressed around the shaft by means of the above mentioned attaching device. This device consists of ring $a$ surrounding the said sleeve and being provided with a head $d$. Rotatably mounted on this head is a thumb-nut $e$, that is made of a material which can not rust, for instance steel-bronze. The said nut is provided with a circular flange engaging a groove in the head, which has the same shape as the flange. On account of this arrangement the nut, on being rotated, will always move in the same plane. Screwed into the nut is a screw $g$, and the lower part of this screw, which passes through a hole in the head, has a square or other suitable form, so that it can not be rotated but only moved longitudinally. The lower end of the said screw is enlarged so as to form a foot $h$, which is adapted to act upon the above mentioned sleeve, and, when the said screw is in its extreme position the same enters a recess in the head, the said foot forming thereby one part of the wall of the ring. As will be seen from Fig. 2, the groove in which the flange engages is open at one side of the head so that, after the screw $g$ has been unscrewed, the nut can be taken away from the head.

$x$ is a projection on the lower end of the ring which is adapted to enter a hole in the sleeve in order to maintain the ring at the upper end of the sleeve and thus to prevent the same from sliding along the sleeve when the screw is unscrewed.

As will be seen from the drawing the vital part of the attaching device, viz. the screw $g$, is completely protected from rain, sand or the like which might put the same out of function.

Though I have in the foregoing described the attaching device as being applied to soldiers' spades it ought to be understood that the same may be used in connection with any tool having a detachable shaft.

Having now described my invention, what I claim as new and desire to secure by Letters Patent is:

In the herein described means for attaching the shaft to spades or other tools, the combination of a ring, a bored head on the said ring, having a groove therein, a nut rotatably mounted on the said head and having a circular flange engaging the groove in the head, and a screw passing through the hole in the head and engaging with the nut for the purpose set forth.

In witness whereof, I have hereunto signed my name in the presence of two subscribing witnesses.

ERIK CARL MARIA WILHELM STJERNSTEDT.

Witnesses:
 AXEL EHRNER,
 ROBERT APELGREN.